(12) United States Patent
Bosman

(10) Patent No.: US 7,673,482 B2
(45) Date of Patent: Mar. 9, 2010

(54) WHEEL LOCK

(76) Inventor: Duane Bosman, 208 Meadowridge Rd., Valparaiso, IN (US) 46207

( * ) Notice: Subject to any disclaimer, the term of this patent is extended or adjusted under 35 U.S.C. 154(b) by 0 days.

(21) Appl. No.: 12/245,385

(22) Filed: Oct. 3, 2008

(65) Prior Publication Data

US 2009/0090146 A1 Apr. 9, 2009

Related U.S. Application Data

(60) Provisional application No. 60/977,436, filed on Oct. 4, 2007.

(51) Int. Cl.
*F16B 41/00* (2006.01)

(52) U.S. Cl. ............... 70/232; 70/166; 70/225; 70/260; 70/DIG. 57; 301/35.624; 301/37.21

(58) Field of Classification Search .................. 70/225, 70/226, 229–232, 259, 260, DIG. 57; 301/37.21, 301/37.374; 411/372.5, 372.6, 373, 910
See application file for complete search history.

(56) References Cited

U.S. PATENT DOCUMENTS

| | | | | |
|---|---|---|---|---|
| 742,562 | A * | 10/1903 | Becraft ..................... 301/108.5 |
| 1,339,075 | A * | 5/1920 | Toelle ........................... 70/232 |
| 1,430,837 | A * | 10/1922 | Oakes ........................... 70/259 |
| 1,434,492 | A * | 11/1922 | Johnson ........................ 70/260 |
| 1,531,149 | A * | 3/1925 | Stanley ......................... 70/260 |
| 1,587,498 | A * | 6/1926 | Beach ........................... 70/260 |
| 1,587,976 | A * | 6/1926 | Moore .......................... 70/260 |
| 1,645,917 | A * | 10/1927 | Maszczyk ..................... 70/231 |
| 1,704,910 | A |  3/1929 | Bradley |
| 1,735,338 | A * | 11/1929 | Root ............................. 70/260 |
| 1,799,593 | A * | 4/1931 | Lavender ...................... 70/260 |
| 1,800,725 | A * | 4/1931 | Galemmo ..................... 70/260 |
| 1,884,992 | A * | 10/1932 | Grabbe ......................... 70/260 |
| 1,912,872 | A |  6/1933 | Trautner |
| 1,961,106 | A * | 5/1934 | Hurd ............................ 70/231 |
| 2,345,949 | A * | 4/1944 | Robbins ....................... 70/232 |
| 2,377,542 | A * | 6/1945 | Crew ........................... 70/232 |
| 3,423,971 | A |  1/1969 | Brunelli |
| 3,696,646 | A | 10/1972 | Loscalzo |
| 3,732,033 | A * | 5/1973 | Macchi ................... 416/244 R |
| 3,818,731 | A * | 6/1974 | Waling et al. ................. 70/232 |
| 3,975,935 | A * | 8/1976 | Masterson .................... 70/232 |
| 4,031,727 | A |  6/1977 | De Groat et al. |
| 4,161,869 | A |  7/1979 | Dixon |
| 4,374,509 | A * | 2/1983 | Kawabata et al. ..... 123/146.5 A |
| 4,645,397 | A |  2/1987 | Howe |

(Continued)

*Primary Examiner*—Lloyd A Gall
(74) *Attorney, Agent, or Firm*—Maginot Moore & Beck

(57) ABSTRACT

A wheel lock mounted for preventing removal of the wheel from the axle includes a cup shaped base portion with an opening to receive a wheel stud for threaded engagement with a lug nut to clamp the base portion to the wheel. A cup shaped cover portion nests within the base portion to enclose the stud and lug nut. A key actuated locking member extends simultaneously through the base and cover portions to prevent separation. The cover portion interlocks with the locking portion to prevent forced rotation of the cover portion relative the base portion. The contour of the base portion or the positioning of the locking member may be configured to prevent rotating the device about the stud. The cover portion may include a flange that bears against the rim of the base portion giving the wheel lock a contiguous exterior surface that is difficult to pry apart.

14 Claims, 4 Drawing Sheets

U.S. PATENT DOCUMENTS

| | | | |
|---|---|---|---|
| 4,856,305 A * | 8/1989 | Adams | 70/58 |
| 4,862,716 A | 9/1989 | Derman | |
| 5,010,748 A | 4/1991 | Derman | |
| 5,037,260 A | 8/1991 | Rubin | |
| 5,214,945 A | 6/1993 | Martin | |
| 5,853,228 A | 12/1998 | Patti et al. | |
| 6,044,674 A | 4/2000 | Rushing et al. | |
| 6,273,658 B1 | 8/2001 | Patterson et al. | |
| 6,419,326 B1 | 7/2002 | Rains | |
| 6,532,780 B1 * | 3/2003 | Frantz | 70/225 |

* cited by examiner

WHEEL LOCK

REFERENCE TO RELATED APPLICATION

This application claims priority to provisional application No. 60/977,436 filed on Oct. 4, 2007, the disclosure of which is incorporated herein by reference.

BACKGROUND

The present invention relates to wheel locks for limiting the removability of the lug nuts from a vehicle wheel.

Truck wheels are secured to truck axles by lug nuts threaded onto an array of threaded posts or studs projecting from the axle hub. The lug nuts are engaged by a simple wrench, socket, or tire tool. Just as simply, the lug nuts can be removed by thieves intent on stealing the valuable tires on the wheel. This is problematic because tires are an expensive component of any truck, especially 18-wheelers.

Efforts have been made in the past to provide devices to prevent unwanted removal of the lug nuts holding the wheel on the axle. Any such device must be easy to use without interfering with the ability to tighten the lug nuts completely. While many prior devices cover and protect a lug nut from easy removal, the devices themselves are subject to being pried apart or open to allow access to the lug nut within.

Therefore a need exists for a wheel lock that is easy to use and resists improper removal.

SUMMARY

A wheel lock that is virtually tamper proof, short of complete destruction of the device includes an overlapping or nesting cup structure between a base portion and a cover portion in which the peripheral wall of the cover portion is fully contained within the peripheral wall of the base portion. The base portion may include a contoured surface that prevents removal of the device by rotating the base portion about the stud. The cover portion includes a circumferential flange that overlaps the upper rim of the base portion to limit pry point access.

The locking portion includes a locking pin that passes through openings in both the base portion and the cover portion. The locking portion also prevents the device from being rotated about the stud for unauthorized removal. In one embodiment, the cover portion includes an extension in the form of a wing and notch structure that interlocks with the locking portion. In another embodiment, the cover portion includes an interlock element that engages an opening in the locking portion. In both embodiments the rotation of the cover portion relative to the base portion is limited to prevent a would-be thief from shearing the locking pin.

DETAILED DESCRIPTION

Figure 1:
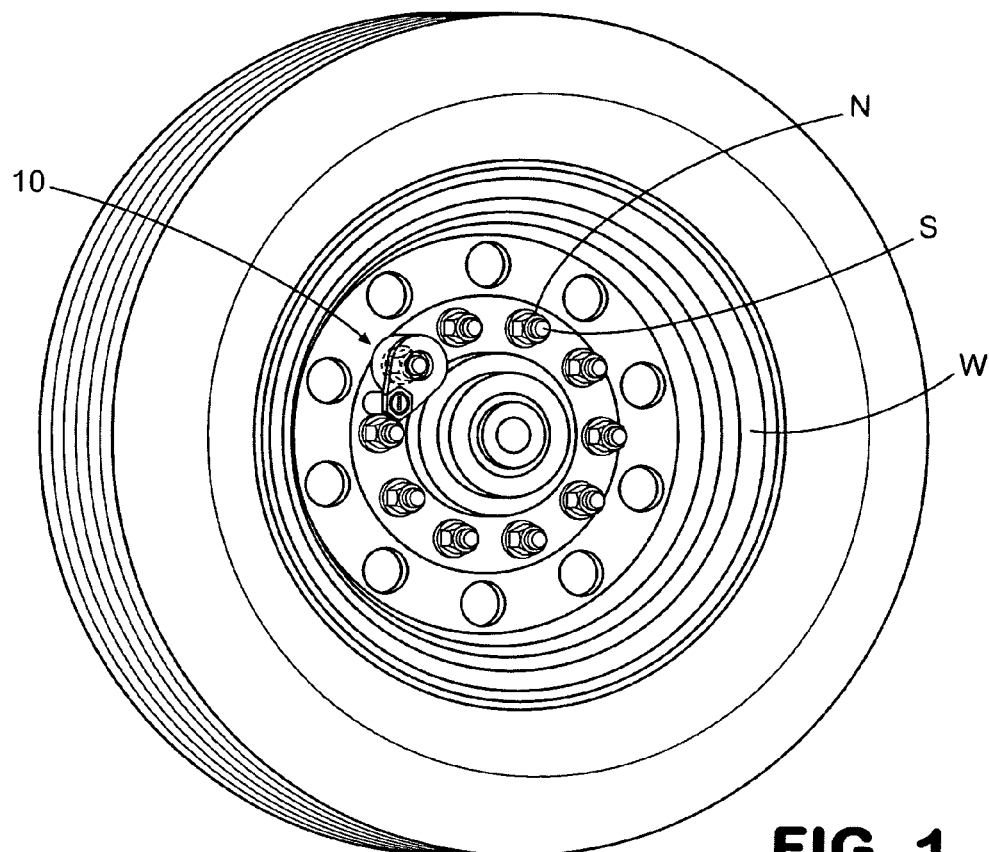
FIG. 1 illustrates a perspective view of the wheel lock installed on a truck wheel.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2:
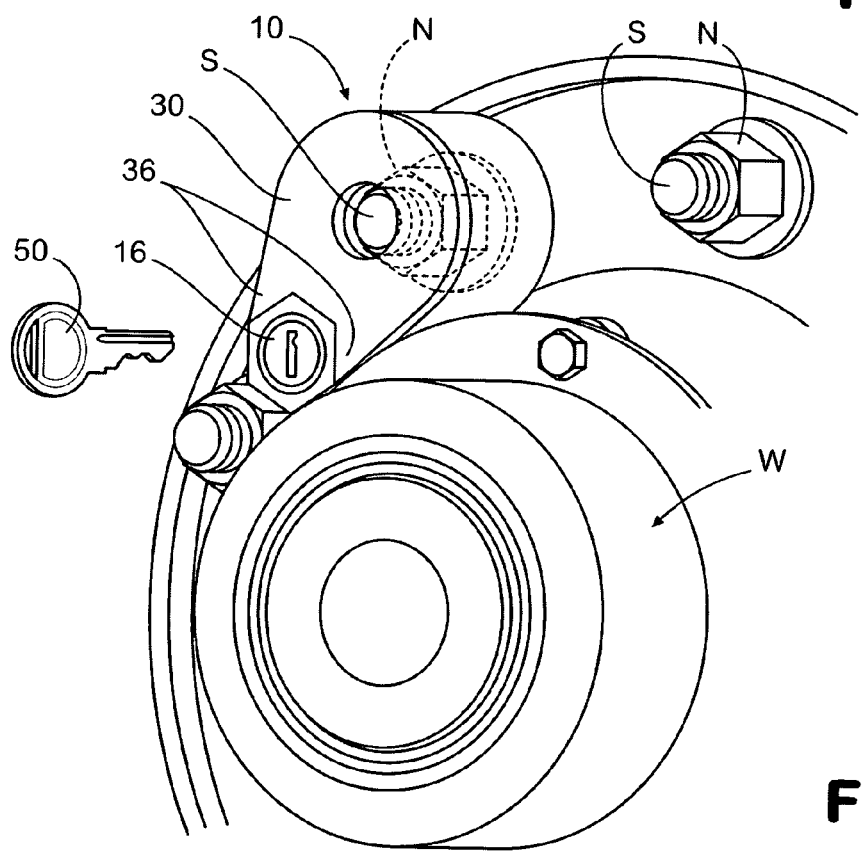
FIG. 2 is a perspective view of the wheel lock installed on a truck wheel depicting the interlocking notch.

In accordance with one embodiment of the present invention, a wheel lock 10 is mounted to a lug nut N of a truck wheel W, as shown in FIGS. 1 and 2. Even though a truck wheel W has many lug nuts N, a user needs only one wheel lock 10 per wheel W. It can be appreciated that locking one lug nut N against removal in effect locks the wheel W to the axle, even if all of the other lug nuts N are removed.

Figure 3:
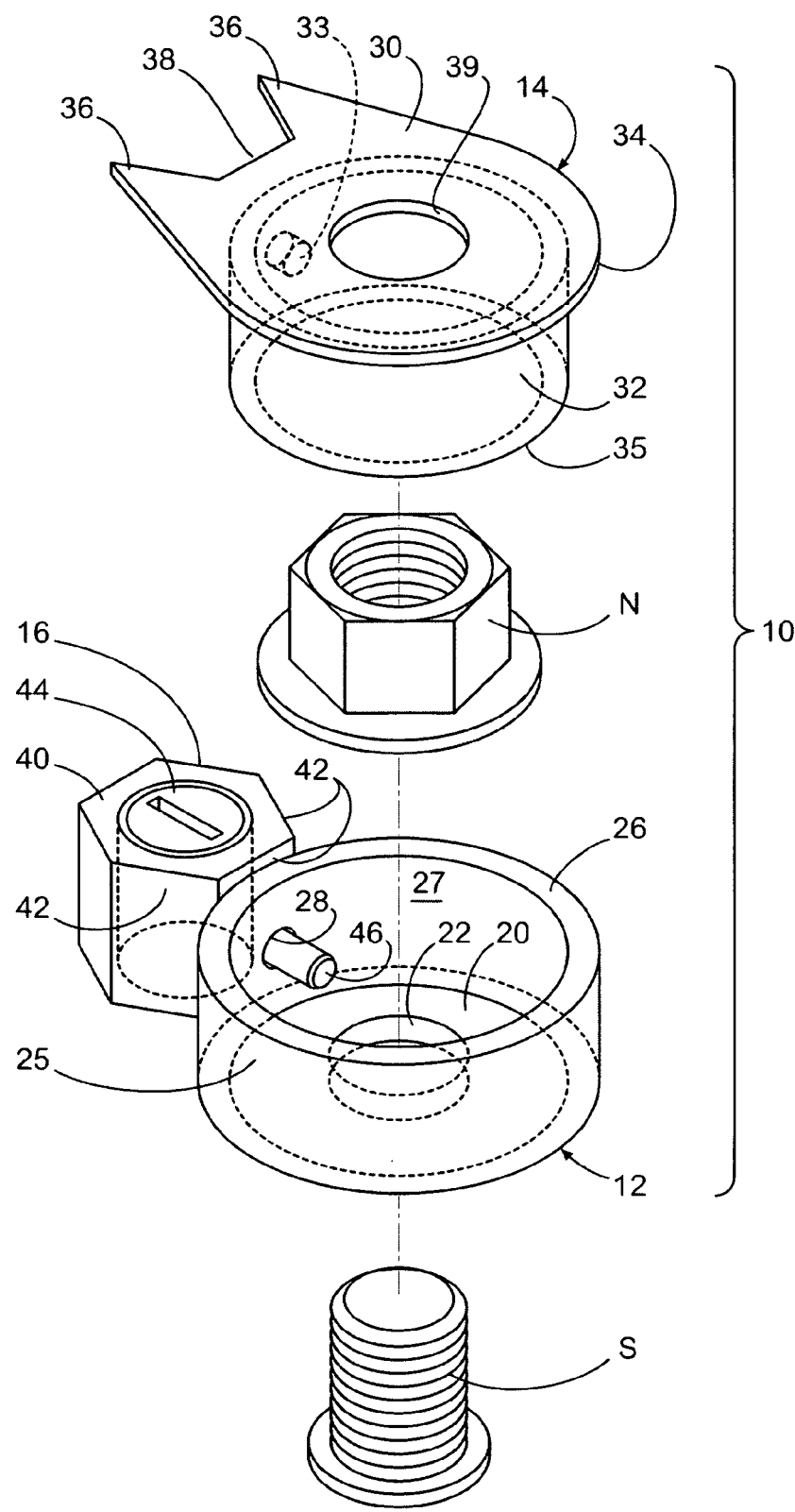
FIG. 3 illustrates a perspective view of the wheel lock, with the locking pin extended through the base portion.
Figure 4:
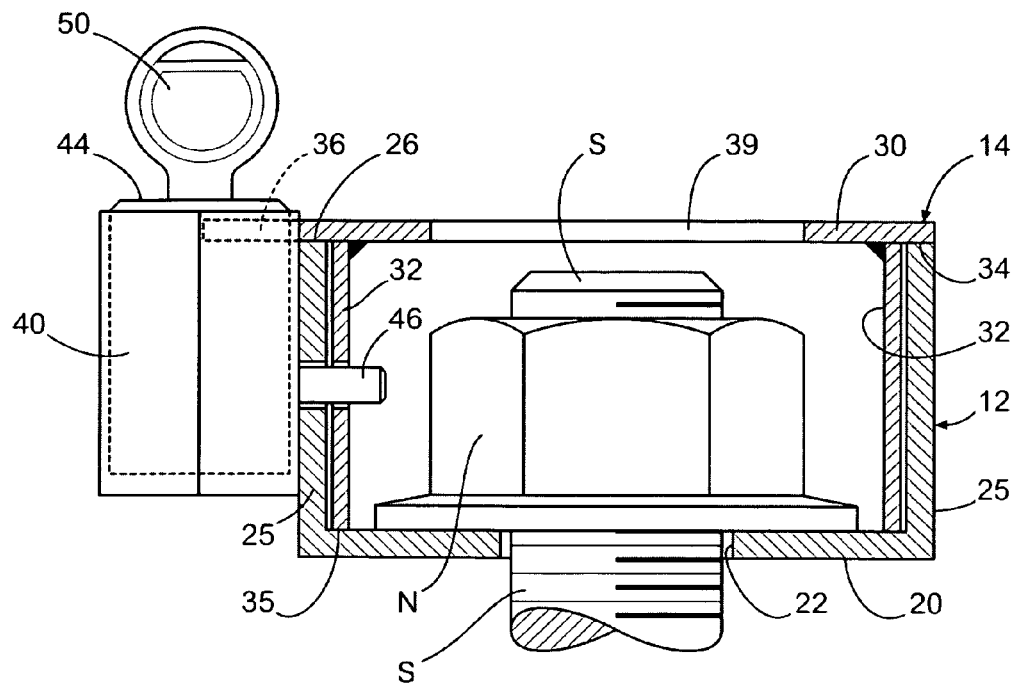
FIG. 4 illustrates a cutaway view of the wheel lock in the locked orientation, a lug nut secures the base portion to a wheel stud and the locking pin extends through the base portion and the cover portion.

The details of one embodiment of the wheel lock 10 are illustrated in FIGS. 3 and 4. In particular, the wheel lock 10 includes a base portion 12, a cover portion 14 and a locking portion 16. The base portion 12 includes a base plate 20 with a hole 22 for receiving a threaded stud S of the vehicle wheel W, as shown in FIG. 4. In use the base plate 20 is mounted over the stud S and bears against the portion of the wheel surrounding the stud. The nut N is then threaded onto the stud S and tightened against the base plate 20 to lock the base portion 12 to the wheel. The base plate 20 may incorporate a surface finish around the hole 22 to enhance the frictional engagement of the nut with the base plate and thereby resist unthreading of the lug nut from the stud.

Figure 5:
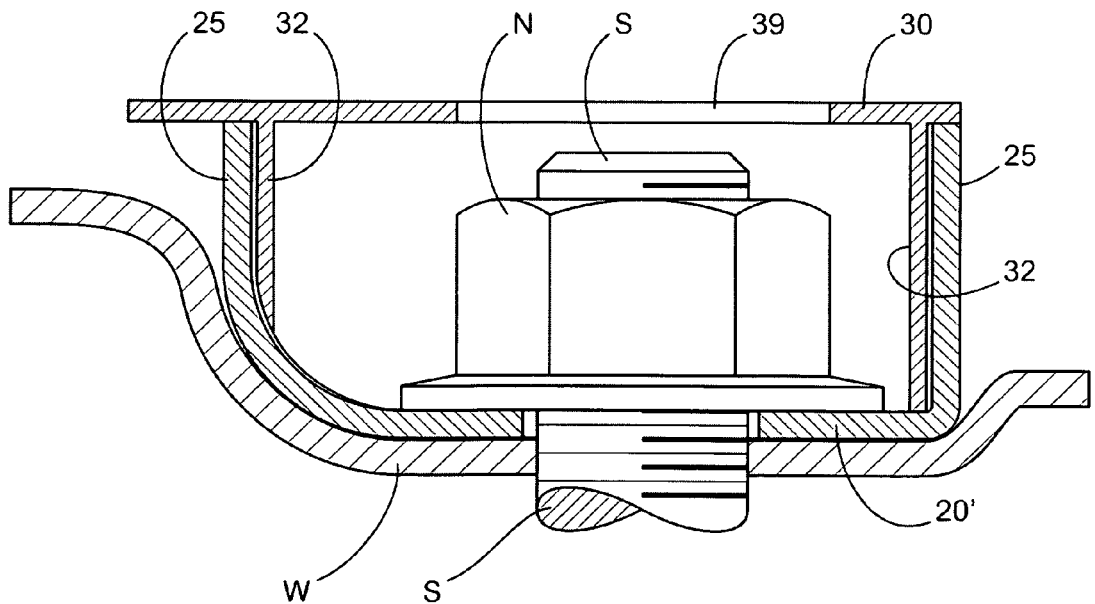
FIG. 5 depicts a cutaway view of the base portion having a base plate with a surface contour to match the surface contour of the wheel.

In the illustrated embodiment, the base plate 20 is shown as being generally flat. However, in another embodiment, as illustrated in FIG. 5, the base plate 20' may have a contour that matches the contour of the wheel W. The contoured base plate 20' interlocks with the contour of the wheel W to resist rotation of the base portion 12 should a person attempt to remove the device 10 and the lug nut N by rotating the entire device 10 about the stud S. The base plate 20 is shown with an exemplary contour, but other contours are possible depending on the contour of the particular wheel W upon which the device 10 is to be mounted.

Attached to or integral with the base plate 20 is an outer peripheral wall 25 that defines an interior surface 27. The base plate 20 and outer peripheral wall 25 thus form a cup that is mounted over the stud S with the opening of the cup facing outward. This cup is configured to mate with a downward facing cup, in the form of the cover portion 14. The figures herein illustrate the base plate 20 and outer peripheral wall 25 in a circular configuration; however, the device 10 is not limited to only circular configurations. For example the base plate 20 and outer peripheral wall 25 could have an elliptical or even a multi-sided periphery.

The cover portion 14 includes an inner peripheral wall 32 that is sized to fit snugly within the outer peripheral wall 25. Preferably, the inner peripheral wall 32 is configured for a close running fit with the interior surface 27 of the outer peripheral wall 25. This close fit prevents dislodgement or destruction of the wheel lock 10 by a would-be thief, and also helps protect the lug nut N from the elements. It is also contemplated that the outer peripheral wall defines a depth to the base plate and that the inner peripheral wall of the cover portion is sized to extend substantially along the entire depth of the first peripheral wall—i.e., so that the lower edge 35 of the cover portion resides closely adjacent the base plate 20 when the two portions are in nested engagement.

Attached to or integral with the inner peripheral wall 32 is a cover plate 30. The cover plate 30 is larger than an outer extent of the inner peripheral wall 32 so that the cover plate 30 forms a flange 34 around the inner peripheral wall 32. This flange 34 is configured to bear against the upper rim 26 of the outer peripheral wall 25 of the base plate 20, as illustrated in FIGS. 2 and 4, and makes the cover portion 14 extremely resistant to tampering. In particular, the flange 34 has an outer dimension that is no greater than, and preferably slightly less than, the outer dimension of the outer peripheral wall 25. The cover portion 14 will thus form a flush interface with the upper rim 26 of the outer peripheral wall 25, with the interface having no points that provide access for a prying implement, such as a screwdriver or crowbar. Even if a thief were to insert a prying tool between the flange 34 and the upper rim 26, the overlapping relationship between the inner peripheral wall 32 and the outer peripheral wall 25 prevents the cover portion 14 from being pried apart or de-nested from the base portion 12. In particular, the length of overlap between the peripheral walls 32 and 25 makes it virtually impossible to pry the cover portion 14 away from the base portion 12 enough to dislodge the inner wall 32 from the outer wall 25, or to disconnect the inner wall 32 from the locking member 46.

Additionally, the flange 34 forms a weather-tight joint between the cover plate 30 and the upper rim 26 of the outer peripheral wall 25. The weather-tight joint prevents road debris and salt from contacting the lug nut N and stud S, which could potentially make the lug nut N difficult to remove. Alternatively, the cover plate 30 may define an opening 39 to permit inspection of the lug nut N within the device 10. The central opening 39 is small enough so that the opening 39 cannot be used as an effective pry point in an attempt to remove the locked device 10.

The locking portion 16 includes a lock body 40 that is attached to or integral with the base portion 12. The body 40 preferably has at least two interdigitating faces 42, and most preferably has a hexagonal shape. The body 40 carries a lock cylinder 44 within a first opening in the body 40, and most preferably recessed therein. As shown in FIG. 2, the lock cylinder 44 is readily available for key access when the device 10 is mounted to a wheel W. The lock cylinder 44 is of the type that includes a locking member 46, such as a pin, that projects from the locking portion 16 when a user turns a key 50. The locking member 46 is arranged to pass through an opening 28 in the outer peripheral wall 25 of the base portion 12, as depicted in FIG. 3. Moreover, when the cover portion 14 is mounted over the base portion 12, the locking member 46 also extends through a hole 33 in the inner peripheral wall 32 of the cover portion, as shown in FIG. 4. The holes 28 and 33 is positioned so that the cover plate 30 rests substantially flush with the upper rim 26 of the base portion 12 when the locking member 46 extends through the two holes. Again, this flush fit provides no purchase for a prying tool.

The locking member 46 may be a cylindrical pin, as shown in FIGS. 3-4, or may present an angled contour configured to draw the cover portion 14 down into the base portion as the pin extends through the hole 33. The locking member may have other configurations depending upon the nature of operation of the lock cylinder 44. For instance, in some embodiments the lock cylinder may incorporate a rotating locking portion that rotates downward (or upward) and outward from the cylinder. In this embodiment, the holes 28 and 33 can be modified to form aligned slots that receive the modified locking portion as it rotates toward the base and cover portions.

When the device 10 is mounted upon the wheel the locking portion 16 prevents a person from rotating the device 10 about the stud S. In one embodiment, the locking portion 16 abuts the curvature of the wheel W to prevent rotation. In another embodiment, the locking portion 16 prevents rotation by abutting a wheel hub that projects through an opening in the wheel W, as illustrated in FIG. 2. In both embodiments, the locking portion 16 prevents rotation so that friction between the base plate 20 and the lug nut N cannot be utilized to remove the lug nut N while the device 10 remains secured to the stud S.

The cover plate 30 interlocks with the locking portion 16 to prevent the cover portion 14 from rotating relative the base portion 12, which could potentially shear the locking portion. In one embodiment, the cover plate 30 includes an extension in the form of wings 36 defining a notch 38 therebetween to mate with the interdigitating faces 42 of the locking portion 16, as illustrated in FIG. 2. This interdigitation also establishes the alignment of the hole 33 in the cover portion 14 with the opening 28 in the base portion 12, so that the locking member 46 may extend cleanly therethrough. Preferably, the base portion 12 and cover portion 14 are configured for substantially exact alignment of the holes so that extension or retraction of the locking member 46 occurs smoothly with no binding or friction.

Figure 6:
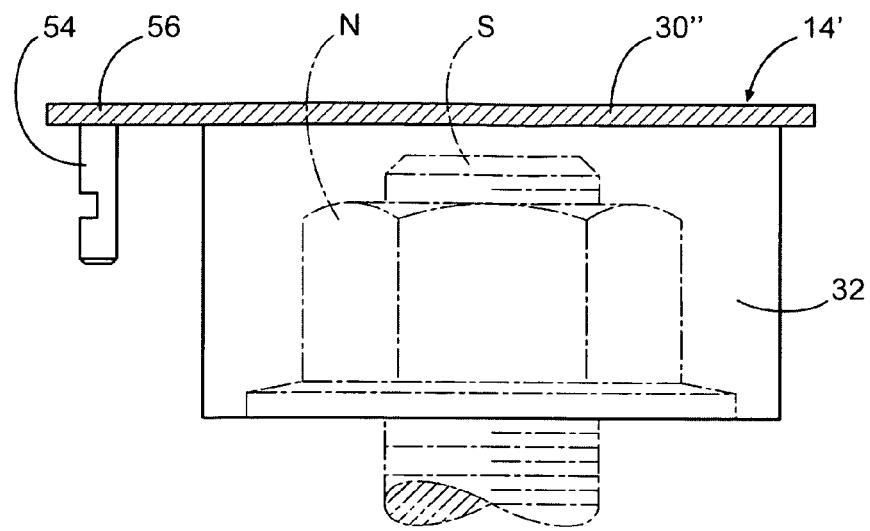
FIG. 6 depicts a side view of the cover portion including a protrusion and an interlock element.
Figure 7:
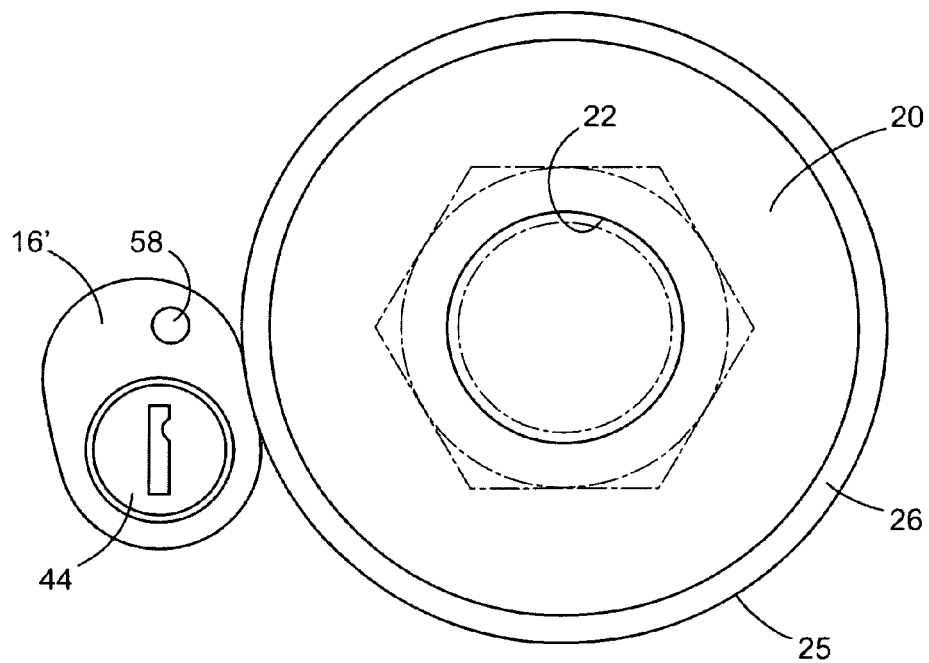
FIG. 7 illustrates a top view of the base portion and the locking portion with the locking portion having a cavity to accept an interlock element.

The configuration of the wings 36 and their orientation in the cramped space between the interdigitating faces 42 and the outer wall 25 also virtually eliminates any space for a would-be thief to introduce a prying tool. In another embodiment, rotation of the cover portion is prevented with a locking portion 16' modified to include a second opening or cavity 58 into which an interlock element 54 is inserted, as depicted in FIGS. 6-7. In this embodiment the cover plate 30" includes a protrusion 56 that extends beyond the outer peripheral wall. The interlock element 54 is attached to or integral with the protrusion 56 and engages the cavity 58 in the locking portion 16' when the cover portion 14' is inserted into the base portion 12. This engagement also establishes the alignment of the hole 33 in the inner peripheral wall 32 with the opening 28 in the outer peripheral wall 25, so that the locking member 46 may extend cleanly therethrough.

In operation, a user positions the base portion 12 with a stud S extending through the hole 22 in the base plate 20. A lug nut N is then tightened onto the stud S, thereby clamping the base portion 12 to the wheel W. The cover portion 14 is then nested with the base portion 12 with the wings 36 and notch 38 interdigitating with the faces 42 of the lock element 16 as shown in FIGS. 3-4, or with the interlock element engaged with the second opening in the lock element as shown in FIGS. 6-7. The cover portion 14 is placed fully within the base portion 12 until the flange 34 bears against the rim 26 of the outer peripheral wall 25. In this position, the hole 33 is aligned with the opening 28. Turning the key 50 activates the lock cylinder 44 by advancing the locking member 46 through the opening 28 and the hole 33. The cover portion 14 thereby becomes locked to the base portion 12. The key 50 is then necessary to unlock the cover portion 14 from the base portion 12 when a user desires to remove the lug nut N.

In a specific embodiment, the base portion 12 and cover portion 14 are formed from 0.1 inch thick stainless steel plate. The base plate 20 has a diameter of about 2.75 inches while the hole 22 for the stud S has a diameter of about 1.0 inches. The outer peripheral wall 25 has a height of about 2.25 inches, while the inner peripheral wall 32 has a height of about 1.75 inches. The wings 36 may extend about 0.75 inches from the inner peripheral wall 32 to interdigitate with the lock body 40. The wings 36 may also be bent downward to limit further the space available to insert a prying tool. The locking member 46 can have a diameter of about 0.25 inches.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

I claim:

1. An apparatus for limiting the removability of a lug nut from a wheel stud of a vehicle wheel, comprising:
    a first portion having a base plate with a hole sized to receive a wheel stud therethrough, a surface for engaging a lug nut threaded onto the stud and a first opening;
    a second portion having a cover plate and a second opening, the first and second portions configured for nested engagement with said cover plate opposite said base plate and said first and second openings in alignment; and
    a locking portion associated with said first portion and having an exterior periphery, said locking portion including a locking member operable to extend through said first and second openings; wherein
    said cover plate defines a notch configured for interlocking engagement with at least a portion of said exterior periphery of said locking portion to prevent relative rotation between said second portion and said locking portion.

2. The apparatus of claim 1 wherein:
    said exterior periphery has a substantially hexagonal shape; and
    said notch is configured complementary to said hexagonal shape.

3. The apparatus of claim 1 further comprising:
    said first and second openings are circular holes; and
    said locking member is a cylindrical post.

4. The apparatus of claim 1 wherein said locking portion includes a key-operated lock cylinder including said locking member and operable to extend said locking member through said first and second openings.

5. The apparatus of claim 1 in which the vehicle wheel has a surface curvature, wherein said base plate of said first portion defines a complementary surface for engaging the surface curvature to prevent rotation of said first portion relative to the vehicle wheel.

6. The apparatus of claim 1 in which the vehicle wheel includes a hub adjacent the wheel stud, wherein said first portion and said locking portion are configured so that said locking portion engages the hub of the wheel upon rotation of the apparatus about the wheel stud, thereby preventing further rotation of the apparatus.

7. The apparatus of claim 1, wherein the cover plate defines a hole opposite said hole in said base plate.

8. The apparatus of claim 1 wherein said first and second portions include peripheral walls configured for a close running fit when in nested engagement.

9. The apparatus of claim 8, wherein said peripheral walls of said first and second portions are generally cylindrical.

10. The apparatus of claim 8, wherein said cover plate includes an extension outside said peripheral wall of said second portion, said extension defining said notch.

11. An apparatus for limiting the removability of a lug nut from a wheel stud projecting from a wheel, the wheel having a surface contour adjacent the wheel stud, said apparatus comprising;
    a first portion having a base plate with a hole sized to receive the wheel stud therethrough, said base plate having a surface for mating with the wheel, said surface having a complementary contour to the surface contour of the wheel to prevent the first portion from rotating about the stud;
    a second portion having a cover plate, and configured for nested engagement with said first portion with said cover plate opposing said base plate; and
    a locking portion parallel to an axis of said hole and mounted on a lateral outside peripheral portion of said first portion and having a locking member operable to simultaneously engage said first and second portions to prevent said first and second portions from being de-nested.

12. An apparatus for limiting the removability of a lug nut from a wheel stud comprising:
    a first portion having a base plate with a hole sized to receive the wheel stud therethrough, said base plate including a first peripheral wall having an upper rim;
    a second portion having a cover plate with a second peripheral wall projecting therefrom, said second peripheral wall being sized and configured to form a close running nested fit with said first peripheral wall; and
    a locking portion having a locking member operable to simultaneously engage said first and second portions to prevent disengagement of the nested fit between said first and second portions; wherein
    the cover plate includes a flange extending outside the peripheral wall of said second portion and supported on said upper rim of said first portion when said first and second portions are in the nested fit,
    wherein said locking portion defines an exterior periphery; and
    said cover plate includes an extension defining a notch configured for interlocking engagement with at least a portion of said exterior periphery of said locking portion to prevent relative rotation between said second portion and said locking portion.

13. The apparatus of claim 12, wherein said flange is sized to be flush with or inboard said first peripheral wall of said first portion.

14. The apparatus of claim 12, wherein:
    said first peripheral wall has a depth between said upper rim and said base plate; and
    said second peripheral wall is sized to extend substantially along the entire depth of said first peripheral wall.

* * * * *